(No Model.)

F. BURLING.
HORSE BOOT.

No. 303,617. Patented Aug. 19, 1884.

Witnesses:

Inventor:
Frank Burling.
By his atty

UNITED STATES PATENT OFFICE.

FRANK BURLING, OF RIPON, WISCONSIN.

HORSE-BOOT.

SPECIFICATION forming part of Letters Patent No. 303,617, dated August 19, 1884.

Application filed March 23, 1883. (No model.)

*To all whom it may concern:*

Be it known that I, FRANK BURLING, a citizen of the United States, residing at Ripon, in the county of Fond du Lac and State of Wisconsin, have invented certain new and useful Improvements in Devices for Breaking or Curing Horses of the Trick or Habit of Interfering; and it consists in fitting to the horse's leg between fetlock-joint and boulet a band or plate that will, by means of its adaptation to said contour, rigidly retain its position and firmly support a projection or guide perpendicular to the band and invariably engaging with the horny face only of the flying hoof when in threatening proximity to the fetlock-joint, and thereupon sharply but without harm or pain to the beast deflect the said threatening foot. The mechanism employed to attain this object is illustrated in the accompanying drawings, in which—

Figure 1:
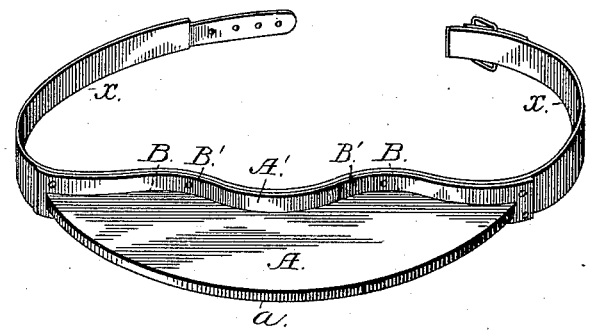
Figure 2:
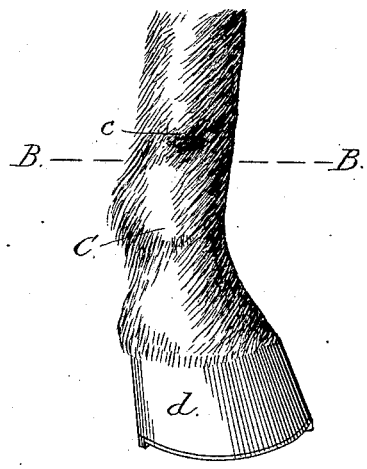

Figure 1 is a perspective view of my device. Fig. 2 is a sketch of the lower extremity of a horse's leg, showing the section whereto my device is attached and the portion of the foot striking and deflected by the guide.

The projection A is a stiff metallic or hard-rubber plate one-quarter to one-half inch thick, of crescent form, its inner or concave edge, B B, conformed longitudinally (as nearly as may be) with the cross-contour of that section of the inside of the horse's leg immediately above the fetlock-joint C, and between it and the boulet $c$. This projection A is flanged on its lower edge with or firmly seated upon a stiff band or plate, A' A', of similar material, and its longitudinal contour B' B' symmetrical with the line B B. The band or plate so composed of A A' B B' extends across and fits closely to the leg-section C $c$, and is secured rigidly in position by straps $x$ $x$, extending from either end, fastened with buckles or equivalent locks on the outside of the leg. It cannot turn horizontally, and vertical displacement is prevented by the fetlock-joint and boulet, respectively. The depth of the projection or guide A will be governed in construction by the desired spread of the feet in action.

It is apparent that when in the position and locality indicated above the convex edge $a$ will invariably meet and engage with the hoof or horny part $d$ only of the opposite foot when threatening interference, and thus while all damage or hurt to the horse is avoided the stroke will be followed with a sensible and sharp deflection and spread of the feet.

For the accommodation of the differently sized and built horses I make and use varied sizes of my device.

I claim as my invention—

The combination, with the supporting and attaching straps, of a thin rigid guard having its base contour curved to correspond with the shape of the specific part of the horse's leg described, and projecting horizontally outward from the attaching-strap, as shown, and substantially as set forth.

FRANK BURLING.

Witnesses:
    THEODORE F. CONKLIN,
    ELIHU COLMAN.